United States Patent [19]

Anderson et al.

[11] E Patent Number: Re. 33,714

[45] Reissued Date of Patent: Oct. 15, 1991

[54] CRIMPING TOOL

[76] Inventors: J. Edward C. Anderson, Moreland Hills; Merritt A. Osborn, Chesterland, both of Ohio

[21] Appl. No.: 305,381

[22] Filed: Feb. 1, 1989

Related U.S. Patent Documents

Reissue of:

[64] Patent No.: 4,640,117
Issued: Feb. 3, 1987
Appl. No.: 626,920
Filed: Jun. 29, 1984

[51] Int. Cl.[5] ..... B21D 7/06

[52] U.S. Cl. ..... 72/410; 81/467; 81/388; 30/363

[58] Field of Search ..... 72/410, 409, 30; 81/467, 478–482, 388–390, 427.5; 29/751, 243.56, 758; 30/363

[56] References Cited

U.S. PATENT DOCUMENTS

| | | | |
|---|---|---|---|
| 1,388,131 | 8/1921 | Tracy | 81/388 |
| 1,641,153 | 9/1927 | Butt | 81/390 |
| 2,556,725 | 6/1951 | Hurlbut . | |
| 2,618,993 | 11/1952 | Carlson . | |
| 2,704,472 | 3/1955 | Booth | 81/481 |
| 2,729,995 | 1/1956 | Friedman et al. | 81/389 |
| 2,737,071 | 3/1956 | Dibner . | |
| 2,786,378 | 3/1957 | Ethington et al. | 81/478 |
| 2,800,042 | 7/1957 | Demler . | |
| 3,059,511 | 10/1962 | Morris . | |
| 3,272,002 | 9/1966 | Dickman | 81/483 |
| 3,330,148 | 7/1967 | Hornung . | |
| 4,132,107 | 1/1979 | Suganuma et al. | 72/453.16 |
| 4,144,737 | 3/1979 | Izraeli . | |
| 4,158,302 | 6/1979 | O'Loughlin . | |
| 4,240,280 | 12/1980 | Foslien . | |
| 4,342,216 | 8/1982 | Gregory . | |
| 4,403,531 | 9/1983 | Bailey et al. | 81/483 |
| 4,581,894 | 4/1986 | Bush et al. | 72/453.16 |
| 4,604,890 | 8/1986 | Martin | 72/410 |

FOREIGN PATENT DOCUMENTS

| | | | |
|---|---|---|---|
| 587349 | 1/1959 | Italy | 81/478 |
| 28437 | of 1909 | United Kingdom | 30/363 |

*Primary Examiner*—Daniel C. Crane

[57] ABSTRACT

A hand operated crimping tool comprising a crimping head 10 and a pair of operating handles 12 for actuating said crimping head. At least one of said handles includes a force sensing arrangement including detent mechanism for maintaining handle portions 80, 88 in an unloaded position until a predetermined crimping force is applied by the crimping head whereupon the detent mechanism releases to allow slight, relative pivotal motion between the handle portions. The detent arrangement includes a tapered extension post 90 defining a recess 100 and a grip 80 pivotally connected to the post. The grip slidably mounts a spring biased slider 98 which defines a recess, confrontingly aligned with the recess in the tapered post when the grip and extension are in an unloaded position. A detent ball 94 is captured between the confronting recesses. The force exerted by the slider on the detent ball resists pivotal movement between the grip and the extension. When the crimping force applied by the crimping head exceeds a predetermined level, the detent ball disengages the slider and allows the grip to pivot slightly with respect to the extension thus providing a tactile and audible indication to the operator that a predetermined crimping force has been reached.

11 Claims, 2 Drawing Sheets

CRIMPING TOOL

Matter enclosed in heavy brackets [ ] appears in the original patent but forms no part of this reissue specification; matter printed in italics indicates the additions made by reissue.

DESCRIPTION

1. Technical Field

The present invention relates generally to hand tools and in particular to a hand operated crimping tool.

2. Background Art

Crimping tools are well known in the art and take many forms. In a typical hand operated crimping tool, a pair of handles, coupled to crimping jaws, are usually squeezed to drive the jaws together. A spring normally urges the jaws and/or handles apart so that releasing the handles causes the jaws to separate.

Crimpers provide a variety of functions including the attachment of terminals to wire ends and the joining of wires using deformable connectors. To provide good electrical contact and mechanical integrity, the connector or terminal must be sufficiently crimped by the installer.

Tools have been suggested incorporating devices which purportedly assured that an operator properly crimped a connection. Usually, these devices prevented the crimping tool from reopening until the jaws and closed to a predetermined or preset position which was determined to be a position at which a proper crimp was achieved. The mechanism for accomplishing this feature typically included a ratchet device which locked the handles of the tool preventing them from separating until they reach the predetermined position. A crimper has also been suggested that included an arrangement for providing a sensory indication that the jaws had reached the predetermined position. In both of these suggested arrangements, the parameter being monitored was the jaw displacement and not the forces being applied to the connector and/or wire. As a result, variations in wire size and/or connector characteristics could produce an undercrimped or overcrimped connection. In the ratchet type tool, even if an operator recognized that he was applying excessive force in crimping the connector, he could do nothing since the crimper would not release the wire or terminal until the jaws closed to the preset position. As a result, a weakened connection caused by excessive connector deformation was pro- duced.

DISCLOSURE OF THE INVENTION

The present invention provides a new and improved hand crimping tool which includes a mechanism for signalling the operator when a predetermined force has been applied by the crimping jaws. Unlike the prior art, the signalling mechanism does not rely on a predetermined displacement of the crimping jaws but instead responds to the crimping force being applied to the connector or terminal. With the present device, variations in wire thickness and/or terminal characteristics will not produce under or over crimped connections.

In accordance with the invention, the crimping tool includes a pair of crimping jaws movable towards and away from each other and a pair of operating handles for actuating the jaws. The actual construction of the crimping jaws and linkage are susceptible to wire variation and the invention should not be limited to the jaw construction and operating linkage disclosed.

In accordance with the invention, at least one of the operating handles includes a portion that moves relative to another portion when the operator exerts a crimping force in excess of a predetermined force. The relative movement between the two portions that occurs when the predetermined force is exceeded, provides a sensory indication to the operator that the jaws have applied a sufficient crimping force.

According to the preferred and illustrated embodiment, the handles are coupled to a linkage mechanism which opens and closes the crimping jaws in response to pivotal motion of the handles. At least one of the handles includes a "breakaway" mechanism which causes a portion of the handle to pivot slightly relative to another handle portion when the force applied by the operator exceeds a predetermined level. The slight but sudden "breakaway" movement of the handle provides a sensory indication to the operator that a predetermined crimping force has been reached. In the preferred and illustrated arrangement, the mechanism provides both an audible and tactile signal to the operator.

In the disclosed embodiment, the "force sensing" mechanism includes one handle portion coupled to the crimping head. Another handle portion is pivotally attached to the one handle portion such that the other handle portion is pivotally movable with respect to the one handle portion through a relatively small arc.

According to the invention, relative pivotal motion in the handle portion is yieldably resisted by a detentlike mechanism. In particular a resiliently biased detent arrangement is carried by one of the handle portions. The other handle portion includes structure for engaging at least a portion of the detent arrangement.

In a normal or "detent" position an element forming part of the detent arrangement is resiliently biased into engagement with a detent recess. This engagement maintains the handle portions in their normal position. When sufficient force is applied to one of the handle portions to overcome the detent biasing force, the element is forced out of the recess allowing the handle portions to pivot slightly relative to each other. When the force is released, the detent mechanism urges the element to reenter the recess thus causing the handle portions to return to their normal positions.

In the preferred and illustrated embodiment, the one handle portion comprises an extension coupled to the crimping head. The other handle portion comprises an operator grip.

Preferably, the extension is defined in part by a tapered post that extends into the handle which is preferably tubular. An end face of the extension includes a recess. A slide is slidably mounted within the grip in confronting relation to the end face of the extension. The biasing arrangement, preferably a coil spring is enclosed within the handle and urges the slide towards the end face. A confronting end face of the slide also includes a recess. When the extension and grip are in a predetermined normal or unloaded position, the respective recesses are aligned.

The detent element, preferably a ball, is resiliently captured between the extension end face and the slider end face due to the force applied by the biasing spring. When the recesses are aligned, the detent ball is received by both recesses and relative pivotal movement between the extension and the grip is resisted by the ball since in order for the grip to move relative to the extension, the ball must roll out of the recess in the slider end face and force the slider to retract against the spring force. By suitably adjusting the force on the slider, the force required to cause the ball to leave the recess in the slider can be adjusted to correspond to the desired crimping force exerted by the jaws.

In operation, as the handles are squeezed, the force sensing grip is urged to pivot with respect to the extension. The detent ball, however, resists this pivotal motion until a sufficient force is applied by the jaws whereupon the ball suddenly leaves the recess allowing the grip to pivot slightly with respect to the extension. This pivotal motion provides a sensory indication to the operator that the predetermined crimping force has been reached. In addition, in the preferred embodiment, the end of the tapered post serves as an abutment to limit the pivotal motion of the grip with respect to the extension. As a result, the sudden movement in the grip causes the extension to strike the inside of the grip producing an audible indication that the preset force has been attained.

The present invention provides an inexpensive mechanism for precisely crimping connectors, wire ends or the like. Unlike the prior art, the present mechanism is force responsive as opposed to jaw position responsive. Consequently, variations in connectors, terminal or wire size will not produce improperly crimped connections. Since the handle responds to the force applied by the crimping jaws, each crimped connection will receive the same crimping force.

The mechanism for accomplishing the present invention is relatively inexpensive and easily manufactured. The force sensing arrangement can be added to virtually any crimping tool in a cost effective manner.

According to a feature of the disclosed crimping tool, the crimping head is adjustable to accommodate a wide variety of connectors. In the preferred and illustrated embodiment, the operating handles are operatively coupled to a crimping jaw assembly and an interchannel. A second crimping jaw assembly is adjustably connected to the interchannel. In the disclosed arrangement, squeezing the operating handles cause the one jaw assembly and interchannel to move towards each other. Since the other jaw assembly is connected to the interchannel, relative movement between the interchannel and the one jaw assembly causes relative crimping motion between the jaw assemblies.

According to a feature of the invention, a pair of linking arms interconnects the interchannel with the other jaw assembly. A threaded adjustment determines the spatial distance between the interchannel end and the other jaw assembly and hence determines the initial and final jaw opening. With the present invention, a wide variety of terminals can be accomplished because the jaw spacing can be adjusted over a considerable range. Squeezing the operating handles causes the jaws to move towards each other through a predetermined distance regardless of the initial spacing of the jaws.

Additional features will become apparent and a fuller understanding obtained by reading the following detailed description made in connection with the accompanying drawings.

BEST MODE FOR CARRYING OUT THE INVENTION

Figure 1:
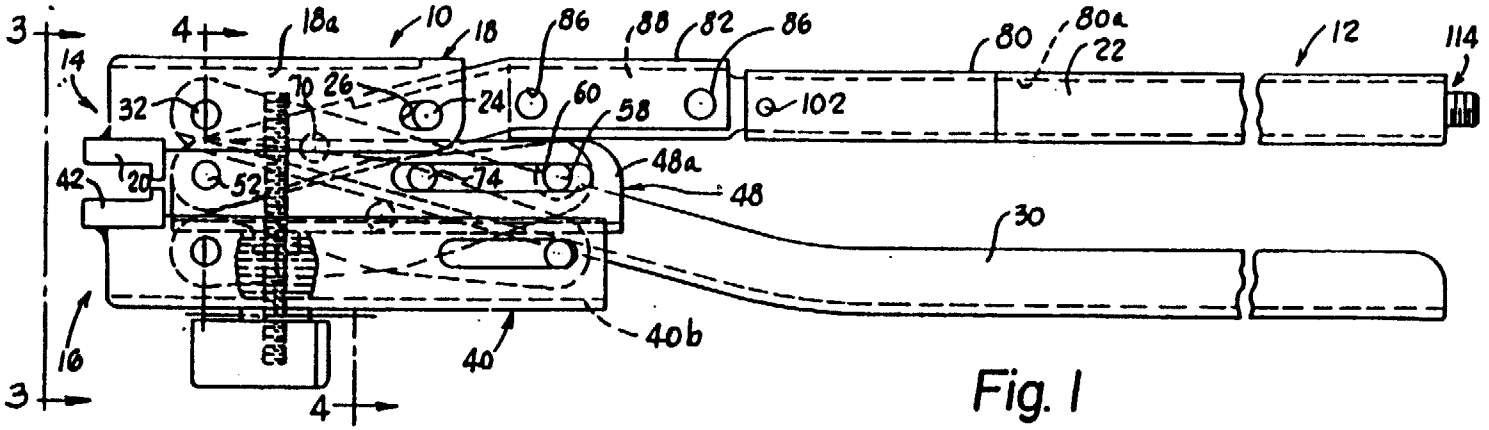
FIG. 1 is a side elevational view of a hand crimping tool constructed in accordance with a preferred embodiment of the invention.

FIG. 1 illustrates the overall construction of crimping tool constructed in accordance with a preferred embodiment of the invention. The tool includes a crimping head, indicated generally by the reference character 10 which is actuated by a pair of operating handles, indicated generally by the reference character 12. The present invention is adaptable to a wide variety of hand operated tools including but not limited to crimpers. The disclosed crimping head 10 is but an example of the type of crimping apparatus with which the present invention can be used.

Figure 3:
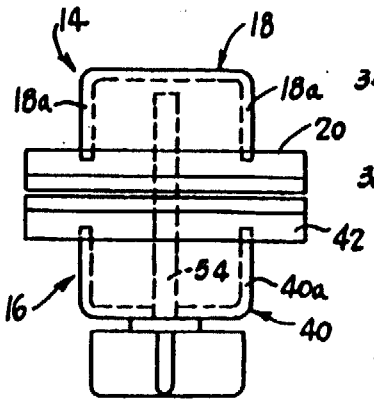
FIG. 3 is an end view of the crimping tool as from the plane indicated by the line 3—3 in FIG. 1.

The crimping head 10 includes upper and lower jaw assemblies 14, 16. The upper jaw assembly 14 is formed by a U-shaped channel 18 (shown in FIG. 3) to which a transversely extending jaw 20 is suitably fastened as by welding.

An upper operating handle assembly 22 is rotatably and slidably pinned to the U-shaped channel 18 by a pin 24 which is captured in aligned slots 26 (only one slot is shown) formed in legs 18a of the channel 18. The engagement between the pin and slot allow the operating handle 22 to pivot and move laterally with respect to the upper jaw assembly 14.

Figure 4:
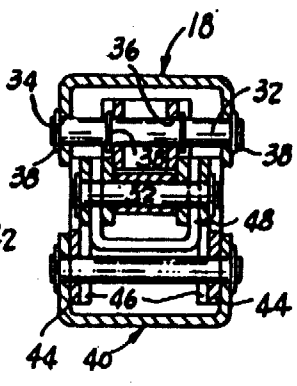
FIG. 4 is a cross sectional view of the tool as seen from the line 4—4 in FIG. 1.

A lower operating handle 30 is also pinned to the upper jaw assembly 14. In particular, the left end of the operating handle 30 (as viwed in FIG. 1) is pivotally connected to the channel legs 18a by a pin 32. As shown best in FIG. 4, the lower handle 30 is U-shaped and the pin 32 extends through aligned apertures 34, 36 formed in the U-channel legs 18a and the lower arm 30, respectively. C-rings 38 retain the pin in the channel 18 as well as locate the arm 30 in a central position.

Figure 2:
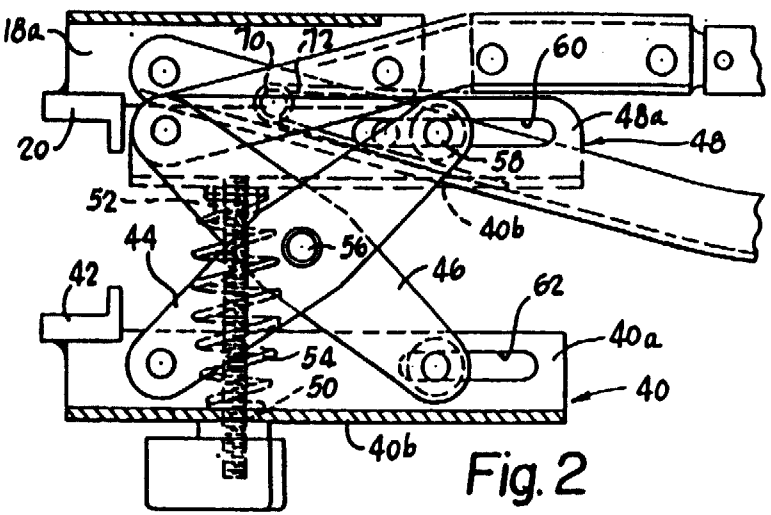
FIG. 2 is a fragmentary elevational view of the hand crimping tool showing the crimping jaws in an opened position.

The lower jaw assembly 16 includes a U-shaped channel 40, similar to the channel 18 in the upper jaw assembly, which mounts a transversely extending jaw 42. As seen in FIG. 2, in the assembled positions, the upper and lower jaws 20, 42 confront each other. The lower jaw assembly 16 also includes a linkage arrangement for adjusting the initial opening of the jaws 20, 42 to accommodate various sized terminals and/or connectors.

The linkage comprises two pairs of pivotally connected linking arms 44, 46 (only one pair of arms is shown in FIG. 2) which interconnect the lower jaw support channel 40 to an interchannel 48. In particular, the linking arms 44, 46 coupld a channel leg 40a of the jaw support channel 40 with an associated channel leg 48a of the interchannel 48.

An adjustment screw 50 extends through an aperture formed in a web portion 40b of the lower jaw support channel and threadedly engages a web portion 48b of the interchannel 48. In the illustrated embodiment, the threaded connection is provided by a threaded element 52 suitably attached to the web 48b of the interchannel 48. A coil spring 54 acting between the interchannel 48 and the jaw channel 40 urges them apart so that as the adjustment screw 50 is counter rotated, the lower jaw 40 moves away from the interchannel 48.

The linking arms 44, 46 are pivotally connected by suitable fasteners such as a rivet 56. The lower end (as viewed in FIG. 2) of the linking arm 44 is pivotally connected to the channel leg 40a of the channel 40. The upper end of the linking arm 44 includes a pin 58 which is slidably captured in a slot 60 formed in the channel leg 48a of the interchannel 48.

The linking arm 46 is pivotally connected at its upper end to the interchannel 48 whereas its lower end is slidably captured in a slot 62 formed in the channel leg 40a of the jaw support channel 40.

It should be apparent that with the disclosed linking arrangement, the jaw support channel 40 and interchannel 48 are maintained in a parallel relationship throughout the adjustment provided by the adjustment screw 50.

Movement of the lower jaw 42 towards and away from the upper jaw 20, during a crimping operation, is achieved by squeezing the operating handles 22, 30. The handles are operatively connected to the interchannel 48, so that opening and closing the handles, produces upward and downward movement in the interchannel 48, relative to the upper jaw assembly 14. Movement in the interchannel 48 produced by movement in the handles 22, 30 is transmitted to the lower jaw 42 by the linking arms 44, 46.

It should be noted that the interchannel 48 moves relative to the jaw support channel 40 only as a result of rotation of the adjustment screw 50. Once the adjustment has been made, the linking arms remain fixed during a crimping operation and the relative spacing between the interchannel 48 and the jaw channel 40 does not change. The linking arms themselves do not produce motion in the jaw 42 during the crimping operation.

Referring to FIGS. 1 and 2, the operating handles 22, 30 are coupled to the interchannel 48 and to each other. The handles are pinned together by pin 70. A spring 72 is captured by the pin 70 and urges the handles 22, 30 apart. The forward end of the upper handle is pivotally connected to the interchannel 48 by the pin 52 which also pivotally connects the upper end of the linking arm 46. The lower handle mounts a pin 74 which rides in the slot 60 formed in the legs 48a of the interchannel 48, just ahead (as viewed in FIG. 2) of the pin 58 attaching the upper end of the linking arm 44 to the slot. The pin 74 extends through the lower handle 30 and coengages the slots 60 formed in the legs 48a of the interchannel 48.

The operating handles 22, 30 are shown in their closed positions in both FIGS. 1 and 2. When the handles are open (not shown) the forward ends of the handles move apart thus separating the upper jaw assembly 14 from the interchannel 48. Actuation of the operating handles 22, 30 produces substantially parallel motion in the upper jaw assembly 14 and the interchannel 48. This is accomplished by the engagement between the upper handle 22 and the upper jaw assembly 14 as provided by the pin 24 in slot 26. A similar pin/slot engagement is provided between the lower handle 30 and the interchannel 48 by the pin 74 and slot 60. Since the lower jaw 42 is coupled to the interchannel 48 (by the linking arms 44, 46) squeezing the operating handles 22, 30 causes movement of the jaws 20, 42 towards each other.

Figure 5:
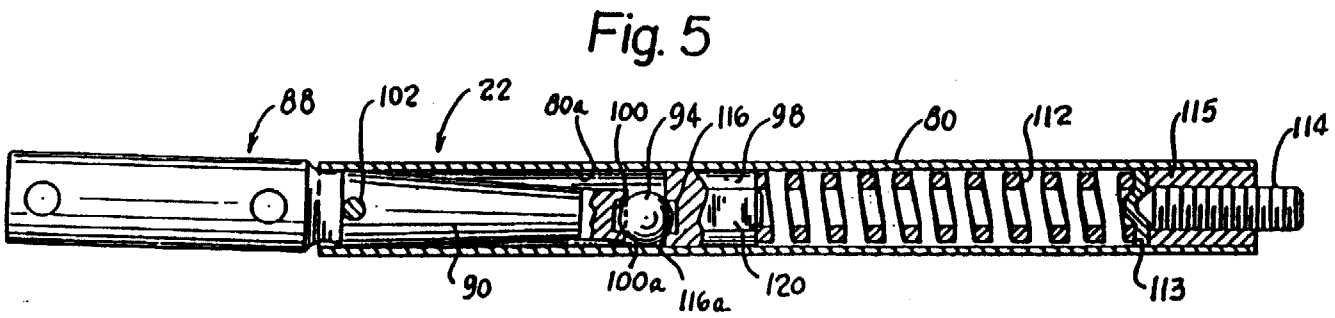
FIG. 5 is a view of a crimping handle, shown partially in cross section, constructed in accordance with the preferred embodiment of the invention.
Figure 6:
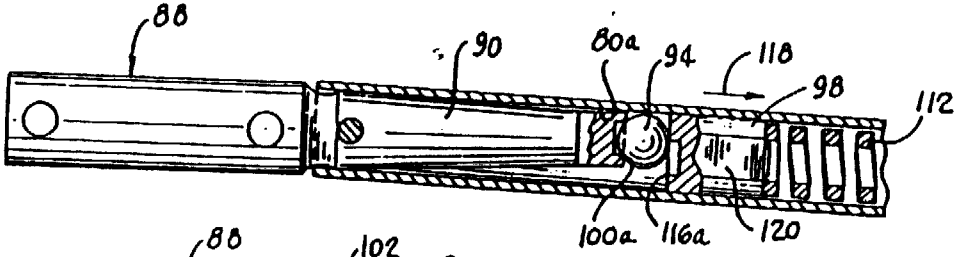
FIG. 6 is a fragmentary view of the handle shown in a position it assumes when a predetermined crimping force is exceeded; and, FIG. 7 is a fragmentary view of the handle shown in FIG. 5, rotated 90°.
Figure 7:
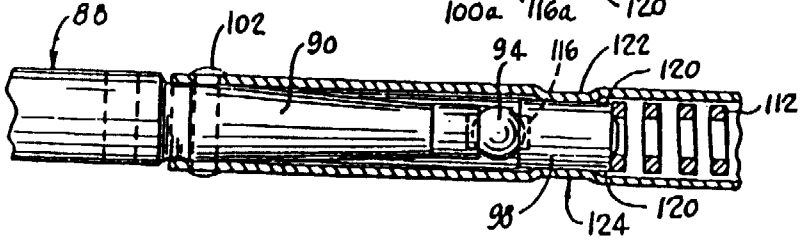

Referring also to FIGS. 5–7, according to the invention, at least one handle includes a force sensing apparatus which in the preferred embodiment provides a tactile and audible indication to the operator that a predetermined crimping force has been reached. In the preferred and illustrated embodiment, the upper handle assembly 22 includes the force sensing feature. In the preferred embodiment, the upper handle assembly 22 includes a grip portion 80 which pivots slightly with respect to the rest of the operating handle assembly 22 when the operator exerts a predetermined crimping force.

The upper handle assembly 22 also includes a channel-like portion 82 (shown in FIGS. 1 and 2) which is coupled to the crimping head 10 as described above via the various pin and slot engagements. The right side of the channel member 82 (as viewed in FIG. 1) includes a pair of apertures 86 by which an extension arm 88 is rigidly fastened, as by rivets. Referring in particular to FIGS. 5–7, the extension arm 88 includes a tapered post 90 which extends into the interior of the grip portion 80. The extension and grip portion 90, 80 together define a detent arrangement by which the grip portion is yieldably maintained in an unloaded position which the grip assumes as long as the crimping force exerted by the operator is less than a predetermined force. When the force is attained, the detent mechanism releases and allows the grip to rotate downwardly (as viewed in FIG. 5) with respect to the extension arm 88.

In the preferred and illustrated arrangement, the detent mechanism comprises a detent ball 94 captured between the end of the tapered extension post 90 and a spring loaded slider 98.

FIG. 5 illustrates the unloaded position of the grip 88. The right end face (as viewed in FIG. 5) of the tapered extension post 90 includes a recess 100 which at least partially receives the detent ball 94. The slider includes a similar recess which is aligned with the extension recess when the gripping portion is in the position shown in FIG. 5. The grip 80 is pivotally connected to the extension arm 88 by a rivet or pin 102. As should be apparent from FIG. 5, the limits of pivotal motion by the grip 80 are determined by the extent of taper of the extension arm 90.

The slider 98 is slidably mounted inside the grip 80. A coil spring 112 is captured between the slider 98 and an spring plate 113. The bias on the slider exerted by the compression spring is adjustable by an adjustment screw 114 threadly received by the end of the grip 80 and abuttably engaging the spring plate 113. The slider defines a recess 116 on its left radial face (as viewed in FIG. 5) which is preferably located off-center so that when the recesses 100, 116 in the extension arm and slider 90, 98 are aligned, the grip is near one extreme of its pivotal movement as shown. As indicated above, when the recesses are aligned, the detent ball 94 is captured therebetween. In order for the grip 80 to move relative to the extension arm 90 the slider 98 must move rightwardly as indicated by the arrow 118 in FIG. 6 to allow the detent ball to roll out of the slider recess 116. This rightward movement is resisted by the compression spring 112. When the force applied to the jaws by the grip 80 exceeds the resistance force exerted by the compression spring 112 on the slider 98, the slider retracts to allow the ball to roll upwardly and in effect allows the grip 80 to pivot downwardly until its inside wall 80a abuts or strikes the tapered post 90.

This slight "breakaway" or pivoting that occurs when a predetermined force is exceeded, produces both a tactile and audible indication to the operator that a predetermined crimping force has been applied by the jaws. It should be apparent that the force to be sensed is set by suitable compression of the compression spring by the adjustment screw 114.

Since the recess 116 in the slider 98 must remain in a predetermined orientation with respect to the extension arm 90, the slider 98 should be restrained from rotating. One method of preventing rotation which is contemplated by the present invention is forming the grip 80 from a tube having a noncircular cross-section and forming the slider 98 with a complementary shape so that only relative sliding movement between the slider 98 and the interior of the tube is permitted. The noncircular cross-sections of the slider and tube would prevent relative rotation.

In the preferred and illustrated embodiment, however, a circular tube is utilized for cost effectiveness. The slider 98 is formed with a pair of oppositely spaced flats 120. As seen in FIG. 7, the wall of the tube is crimped at two opposed regions 122, 124 to define an interior dimension which is only slightly larger than the transverse dimension of the slider as measured across the flats 120. The upset regions 122, 124 of the tube cooperate with the flats 120 to allow sliding motion in the slider 98 while restraining relative rotation between the slider and the grip 80.

The recesses 100, 116 formed in the radial end faces of the extension arm 90 and the slider 98 can be variously shaped. In the preferred embodiment, however, both recesses 100, 116 are circular and are defined by relatively sharp peripheral edges 100a, 116a on which the detent ball 94 seats. The edges resist movement of the ball out of the recesses. Additionally, the recesses may be relatively sized such that the detent ball remains with the extension arm 90 and always moves out of the slider recess 116 as opposed to remaining in the slider recess 116 and rolling out of the extension arm recess 100 when the predetermined force is reached.

Although the invention has been described with a certain degree of particularity, it should be understood that those skilled in the art can make various changes to it without departing from the spirit or scope as hereinafter claimed.

We claim:

1. A plier type hand tool for squeezing, compressing, crimping or pressing, comprising:
   (a) a pair of jaw assemblies including associated jaws movable towards and away from each other;
   (b) a pair of handles for actuating said jaw assemblies;
   (c) linkage means coupling said handles to said jaws such that movement of said handles toward each other produces squeezing movement in said jaw;
   (d) at least one of said handles including:
      (i) an extension forming part of one of said jaw assemblies;
      (ii) a handle member pivotally connected to said extension;
      (iii) said handle member including a spring biased slide element slidable within a portion of said handle member;
      (iv) a detent means captured between said extension and said slide, said extension and slide defining confronting associated recesses when said extension and handle member are in a predetermined position;
      (v) said detent means being releasably captured between said recesses and operative to maintain said predetermined extension and handle member in said position until sufficient force is applied by said jaws to overcome the spring biasing force exerted by said slide on said detent means whereupon said handle member pivots with respect to said extension to provide a sensory indication that a predetermined force has been exerted by said jaws.

2. A hand crimping tool, comprising:
   (a) a crimping head;
   (b) a pair of handles operatively connected to said crimping head such that movement in said handle towards and away from each other, produces attendant reciprocating motion in said crimping head;
   (c) at least one of said handles including a force sensing means, said sensing means comprising:
      (i) a handle portion pivotally connected to another handle portion;
      (ii) a detent mechanism carried by said handle portions;
   (d) said detent mechanism including:
      (i) an extension arm forming part of one of said portions, said extension arm defining a recess on an exposed end face;
      (ii) a spring biased slider carried by another of said handle portions, said slider including a recess, said recesses being confrontingly aligned when said handle portions are in a predetermined position;
      (iii) a detent ball yieldably captured between said recesses;
      (iv) said detent ball and biasing force maintaining said handle portions in said predetermined position until a predetermined crimping force is applied to one of said handle portions whereupon said detent ball disengages one of said recesses to allow said handle portions to pivot slightly, relative to each other.

3. The apparatus of claim 2 wherein said crimping head comprises:
   (a) a jaw assembly operatively connected to said handles;
   (b) an interchannel operatively connected to said handles such that reciprocating movement in said handles produces attendant reciprocating movement in said interchannel and said jaw assembly;
   (c) another jaw assembly disposed in confronting relation with said one jaw assembly;
   (d) linkage means interconnecting said other jaw assembly with said interchannel;
   (e) adjustment means for adjusting the relative spacing between said interchannel and other jaw assembly.

4. A hand crimping tool, comprising:
   (a) a crimping head, said crimping head including:
      (i) a jaw assembly operatively connected to said handles;
      (ii) an interchannel operatively connected to said handles such that reciprocating movement in said handles produces attendant reciprocating movement in said interchannel and said jaw assembly;

(iii) another jaw assembly disposed in confronting relation with said one jaw assembly;

(iv) linkage means interconnecting said other jaw assembly with said interchannel, said linkage means comprising two pairs of cross-linking arms, said arms arranged to maintain substantial parallelism between said [said] interchannel and other jaw assembly throughout a predetetermined adjustment range;

(v) adjustment means for adjusting the relative spacing between said interchannel and other jaw assembly;

(b) a pair of handles operatively connected to said crimping head such that movement in said handles towards and away from each other, produces attendant reciprocating motion in said crimping head;

(c) at least one of said handles including a force sensing means, said sensing means comprising:

(i) a handle portion pivotally connected to another handle portion;

(ii) a detent mechanism carried by said handle portions;

(iii) said detent mechanism including a resilient biasing means for resisting relative pivotal motion in said handle portions until a predetermined crimping force is applied to one of said portions.

5. The apparatus of claim 4 wherein said operating handles include a common pivot point and are operatively connected to said one jaw assembly and interchannel by pin and slot engagements.

*6. A hand crimping tool comprising:*

*a) a pair of interconnected, relatively reciprocal, crimping jaws;*

*b) a pair of handles respectively and operatively connected to said pair of crimping jaws such that pivotal motion in said handles produces crimping movement in said jaws; and,*

*c) one of said handles including a force sensing means, said sensing means comprising:*

*i) a handle portion pivotally connected to a grip portion;*

*ii) a detent means carried by one of the portions and extending into the other portion and yieldably maintaining the grip in an unloaded position until a predetermined crimping force is attained, whereupon the grip portion pivots with respect to the handle portion and the detent means provides a sensory indication that the predetermined force has been attained.*

*7. For a handle crimping tool of the type including a pair of crimping jaws movable towards and away from each other, apparatus for indicating the attainment of a predetermined crimping force, comprising:*

*a) handle structures operatively connected to said crimping jaws to produce relative crimping movement in said jaws;*

*b) at least one of said handle structures including a signalling means for indicating the application of a predetermined compressive crimping force by said jaws, said signalling means including:*

*i) an extension arm portion,*

*ii) a grip portion releasably and pivotally connected to the extension arm portion,*

*iii) elements yieldably maintaining the portions in an unloaded position until such predetermined compressive crimping force is reached, whereupon the portions move relatively, signalling that the predetermined crimping force has been attained.*

*8. A force responsive crimping tool comprising:*

*a) a crimping head;*

*b) a first handle portion coupled to the crimping head such that force applied to said first handle portion produces a crimping action in said crimping head resulting in application of a compressive crimping force on a workpiece;*

*c) a second handle portion pivotally connected to the first handle portion;*

*d) one of the handle portions including a detent mechanism for resisting relative pivotal motion between the first handle portion and the second handle portion;*

*e) the other portion including structure for engaging at least a portion of the detent mechanism, such that the second handle portion is yieldably maintained in a predetermined, normal position, and when a predetermined compressive crimping force is attained, the detent mechanism yields and the second handle portion pivots with respect to the first handle portion, thereby providing a sensory indication that the predetermined crimping force has been achieved.*

*9. The apparatus of claim 8 wherein the detent mechanism includes a resiliently biased detent element.*

*10. A crimping tool comprising:*

*a) a pair of jaws including parallel surfaces adapted to engage and compress objects;*

*b) guiding means connected to the jaws for guiding the surfaces in relative rectilinear motion toward one another in object crimping action and away from one another in object release action, said guiding means maintaining the surfaces in parallel relationship throughout the crimping action;*

*c) a pair of handles connected to the jaws for causing such surface relative motion toward and away from one another in object crimping and object release action;*

*d) at least one of the handles including a pre-settable force responsive structure; and,*

*e) the pre-settable structure including force responsive means responsive to the force applied to an object to detect achievement of the preset force through movement of the surfaces and issue an operator discernable signal whereby a responsive crimping tool operator is apprised that the preset force has been achieved and object release action should be commenced.*

*11. A force responsive crimping tool comprising:*

*a) a pair of opposing crimping heads for engaging and compressing objects;*

*b) a handle means operatively connected to the crimping heads for effecting spatial adjustment movement of the crimping heads towards and away from each other;*

*c) a force sensing grip means responsively connected to the handle means;*

*d) said force sensing grip means including a detent element responsive to a predetermined sensed force; and,*

*e) said detent element yieldably resisting pivotal motion of the grip means with respect to the handle means until a predetermined force is applied to the crimping heads, whereby the grip means responds to the force applied to the crimping heads and pivots with respect to the handle means and thereby provides an indication to the operator that the predetermined crimping force has been attained.*

* * * * *